United States Patent
Katsuki et al.

(10) Patent No.: US 11,875,270 B2
(45) Date of Patent: Jan. 16, 2024

(54) ADVERSARIAL SEMI-SUPERVISED ONE-SHOT LEARNING

(71) Applicant: International Business Machines Corporation, Armonk, NY (US)

(72) Inventors: Takayuki Katsuki, Tokyo (JP); Takayuki Osogami, Yamato (JP)

(73) Assignee: International Business Machines Corporation, Armonk, NY (US)

(*) Notice: Subject to any disclaimer, the term of this patent is extended or adjusted under 35 U.S.C. 154(b) by 698 days.

(21) Appl. No.: 17/114,957

(22) Filed: Dec. 8, 2020

(65) Prior Publication Data

US 2022/0180204 A1    Jun. 9, 2022

(51) Int. Cl.
G06N 3/088    (2023.01)
G06N 3/045    (2023.01)
G06N 3/047    (2023.01)

(52) U.S. Cl.
CPC .............. *G06N 3/088* (2013.01); *G06N 3/045* (2023.01); *G06N 3/047* (2023.01)

(58) Field of Classification Search
CPC ......... G06N 3/045; G06N 3/047; G06N 3/088
See application file for complete search history.

(56) References Cited

U.S. PATENT DOCUMENTS

2018/0336471 A1*  11/2018  Rezagholizadeh ..... G06N 3/047
2019/0012581 A1    1/2019  Honkala

FOREIGN PATENT DOCUMENTS

CN    108256561 B    6/2020
CN    109800785 B    12/2021

OTHER PUBLICATIONS

Mehrotra, Akshay, and Ambedkar Dukkipati. "Generative adversarial residual pairwise networks for one shot learning." arXiv preprint arXiv: 1703.08033 (2017). (Year: 2017).*
Zhang, Ruixiang, et al. "Metagan: An adversarial approach to few-shot learning." Advances in neural information processing systems 31 (2018). (Year: 2018).*
Springenberg, Jost Tobias. "Unsupervised and semi-supervised learning with categorical generative adversarial networks." arXiv preprint arXiv:1511.06390 (2015). (Year: 2015).*

(Continued)

*Primary Examiner* — Eric Nilsson
(74) *Attorney, Agent, or Firm* — Stosch Sabo

(57) ABSTRACT

A method, a computer program product, and a system of adversarial semi-supervised one-shot training using a data stream. The method includes receiving a data stream based on an observation, wherein the data stream includes unlabeled data and labeled data. The method also includes training a prediction model with the labeled data using stochastic gradient descent based on a classification loss and an adversarial term and training a representation model with the labeled data and the unlabeled data based on a reconstruction loss and the adversarial term. The adversarial term is a cross-entropy between the middle layer output data from the models. The classification loss is a cross-entropy between the labeled data and an output from the prediction model. The method further includes updating a discriminator with middle layer output data from the prediction model and the representation model and based on a discrimination loss, and discarding the data stream.

20 Claims, 5 Drawing Sheets

(56) References Cited

OTHER PUBLICATIONS

A. Goyal, A. Lamb, Y. Zhang, S. Zhang, A. Courville and Y. Bengio, "Professor Forcing: A New Algorithm for Training Recurrent Networks," 30th Conference on Neural Information Processing Systems (NIPS 2016), Barcelona, Spain, 9 pages.
B. Ravi Kiran, D. Mathew Thomas, R. Parakkal, An overview of deep learning based methods for unsupervised and semi-supervised anomaly detection in videos.
E. Tzeng, J. Hoffman, K. Saenko and T. Darrell, "Adversarial Discriminative Domain Adaptation," 2017 IEEE Conference on Computer Vision and Pattern Recognition (CVPR), Honolulu, HI, 2017, pp. 2962-2971, doi: 10.1109/CVPR.2017.316.
M. Le Nguyen, H. Gomes and A. Bifet, "Semi-supervised Learning over Streaming Data using MOA," in 2019 IEEE International Conference on Big Data (Big Data), Los Angeles, CA, USA, 2019 pp. 553-562. doi: 10.1109/BigData47090.2019.9006217.
T. Wagner et al, "Semi-Supervised Learning on Data Streams via Temporal Label Propagation," Proceedings of the 35th International Conference on Machine Learning, Stockholm, Sweden, PMLR 80, 2018. Copyright 2018.
Y. Zhu and Y. Li, "Semi-Supervised Streaming Learning with Emerging New Labels," vol. 34 No. 04: AAAI-20 Technical Tracks 4, AAAI Technical Track: Machine Learning, Copyright (c) 2020 Association for the Advancement of Artificial Intelligence.
Yanchao Li, Yongli Wang, Qi Liu, Cheng Bi, Xiaohui Jiang, Shurong Sun, Incremental Semi-supervised Learning on Streaming Data, Pattern Recognition (2018), doi: https://doi.org/10.1016/j.patcog.2018.11.006.
PCT/IB2021/060921, International Search Report and Written Opinion dated Mar. 2, 2022.

\* cited by examiner

ADVERSARIAL SEMI-SUPERVISED ONE-SHOT LEARNING

BACKGROUND

The present disclosure relates to adversarial learning, and more specifically, to adversarial semi-supervised one-shot learning using a data stream.

Adversarial learning is a machine learning training process where two models attempt to weaken each other and, as a result, improve the predictions produced by each model. A generative adversarial network is a common adversarial learning approach using two neural networks that contest with each other. Given a training set, this technique learns to generate new data with the same statistics as the training sets. The training includes indirect training through the use of a discriminator where the neural networks are trained to fool the discriminator.

One-shot learning is a form of machine learning where data is obtained, a model is trained with that data, and then the data is discarded. The data is not saved after a training cycle. As such, there is an emphasis on algorithms that support knowledge transfer, which makes use of prior knowledge of learned categories and allows for learning on minimal training examples. One way of knowledge transfer is through the reuse of model parameters, based on the similarity between previously and newly learned classes.

SUMMARY

Embodiments of the present disclosure include a computer-implemented method of adversarial semi-supervised one-shot training using a data stream. The computer-implemented method includes receiving a data stream based on an observation, wherein the data stream includes unlabeled data and labeled data. The computer-implemented method also includes training a prediction model with the labeled data using stochastic gradient descent based on a classification loss and an adversarial term and training a representation model with the labeled data and the unlabeled data based on a reconstruction loss and the adversarial term. The adversarial term is a cross-entropy between the middle layer output data from the models. The classification loss is a cross-entropy between the labeled data and an output from the prediction model. The computer-implemented method further includes updating a discriminator with middle layer output data from the prediction model and the representation model and based on a discrimination loss, and discarding the data stream.

Additional embodiments of the present disclosure include a computer program product of adversarial semi-supervised one-shot training using a data stream, which can include computer-readable storage medium having program instructions embodied therewith, the program instruction executable by a processor to cause the processor to perform a method. The method includes receiving a data stream based on an observation, wherein the data stream includes unlabeled data and labeled data. The method also includes training a prediction model with the labeled data using stochastic gradient descent based on a classification loss and an adversarial term and training a representation model with the labeled data and the unlabeled data based on a reconstruction loss and the adversarial term. The adversarial term is a cross-entropy between the middle layer output data from the models. The classification loss is a cross-entropy between the labeled data and an output from the prediction model. The method further includes updating a discriminator with middle layer output data from the prediction model and the representation model and based on a discrimination loss and discarding the data stream.

Further embodiments are directed to a system of adversarial semi-supervised one-shot training using a data stream. The system includes a memory, a processor, local data storage, having stored thereon computer-executable code to perform the methods described above. The system also includes a prediction model configured to predict a vehicle behavior, wherein the prediction model is trained with labeled data from a data stream using stochastic gradient descent based on a classification loss and an adversarial term. The system also includes a representation model configured to predict the vehicle behavior, wherein the representation model is trained with unlabeled data and the labeled data from the data stream based on a reconstruction loss and the adversarial term. The system further includes a discriminator configured to predict predictions made by the prediction model and the representation model, wherein the discriminator is trained with middle layer output data from the prediction model and the representation model and based on a discrimination loss. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
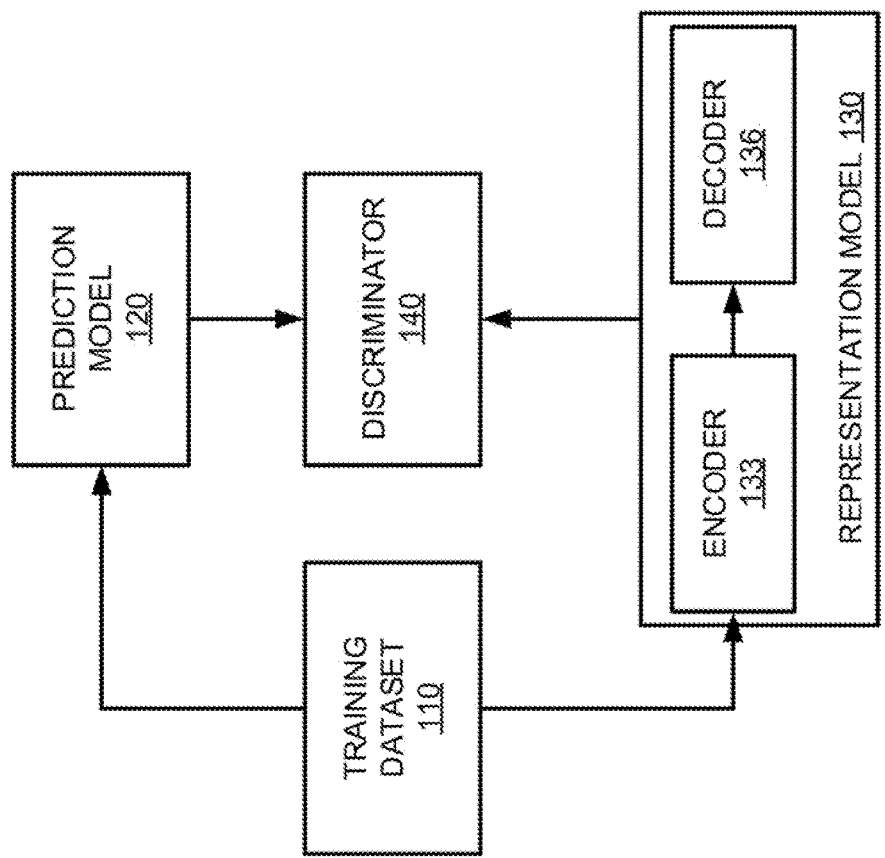
FIG. 1 is a block diagram illustrating an adversarial semi-supervised one-shot learning system, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to adversarial learning, and more specifically, to adversarial semi-supervised one-shot learning using a data stream. While the present disclosure is not necessarily limited to such applications, various aspects of the disclosure may be appreciated through a discussion of various examples using this context.

Autonomous vehicles can reduce potential accidents and improve road safety through the use of sensors implemented on the vehicle. Through the use of sensor analysis, an autonomous vehicle can understand the current state of other vehicles and proactively anticipate their future behavior. Additionally, predictions can be made about not only other vehicles but also about pedestrians, weather conditions, as well as operator awareness. For example, sensor data can be used to predict accident risks and driver drowsiness.

The sensors continuously monitor various conditions and report the conditions to the autonomous vehicle generating a data stream of information. This information can be analyzed by the vehicle or through a cloud service, and the vehicle can decide whether an action is required based on the sensor data. For example, the autonomous vehicle can perform actions such as apply its brakes, turn on its headlights, swerve around an object, accelerate, and the like.

Typically, machine learning models used by autonomous vehicles are trained in when there is a sufficient number of training data samples with correct labels available. This type of training can be referred to as batch learning. In batch learning, data is collected (e.g., the data stream from sensors observations) at some interval. For example, the intervals can be every second, every minute, once a day, and the like. The intervals can also be based on the type of sensor and the sensor reading being observed.

Limitations on training autonomous vehicle machine learning models exist; however, batch learning requires using past data for each training iteration requiring large computational resources. Data streams can accumulate copious amounts of data over a short amount of time, and retaining all of that data over a long period may not be feasible. Additionally, the models may not be updated as frequently as labeled data may not be available for long periods of time.

Embodiments of the present disclosure may overcome the above and other problems by using an adversarial semi-supervised one-shot learning system. The adversarial semi-supervised one-shot learning system can train machine learning models using a data stream and then discard the data stream once the training cycle is complete. Additionally, the data stream need not necessarily always be labeled. Since labeled data is not necessarily available at times, the adversarial semi-supervised one-shot learning system can train its machine learning models with only unlabeled data for some training cycles. The useful information on the unlabeled data can be stored in an unsupervised representation model. When labeled data is available, a supervised prediction model can be trained. During these training cycles, an adversarial discriminator model is implemented to improve the predictions of each model.

More specifically, the adversarial semi-supervised one-shot learning system can utilize a data stream generated by an autonomous vehicle and take that information as training data. The unlabeled data can be used to train a representation machine learning model, and the labeled data, if available, can be used to train a prediction machine learning model. Both models are trained to fool a discriminator model, which is trained from data taken from the middle layers of the representation and prediction models. This process restricts the prediction model to make predictions similar to that of the representation model and vice versa. Once the training cycle is complete, the data stream is discarded so as to preserve computational resources.

In some embodiments, the representation model is an autoencoder based on a neural network. An autoencoder includes an encoding component and a decoding component. This format assists the representation model in storing the relevant information learned from the data stream while not having to retain that information in subsequent training cycles. The representation model can be trained with unlabeled data and labeled data relating to the data stream and based on a reconstruction loss and an adversarial term calculated at the time of training.

In some embodiments, the prediction model is a neural network that uses stochastic gradient descent on the labeled training data. Stochastic gradient descent follows a negative gradient of an objective after seeing only a single or a few training samples. Additionally, the use of stochastic gradient descent in a neural network setting is motivated by the high cost of running backpropagation over a full training set. Stochastic gradient descent can overcome the cost while also leading to fast convergence of the data. The prediction model can also use stochastic gradient descent based on a classification loss and an adversarial term calculated at the time of training.

In some embodiments, the discriminator is a neural network configured to discriminate between middle layer outputs of the prediction model and middle layer outputs of the representation model. The discrimination can also be based on a discrimination loss calculated at the time of training. For example, the middle layer output of the representation model can be the output produced after encoding a sample.

Adversarial learning is a machine learning training process where two models attempt to weaken each other and, as a result, improve the predictions produced by each model. A generative adversarial network is a common adversarial learning approach using two neural networks that contest with each other. Given a training set, this technique learns to generate new data with the same statistics as the training sets. The training includes indirect training through the use of a discriminator where the neural networks are trained to fool the discriminator.

One-shot learning is a form of machine learning where data is obtained, a model is trained with that data, and then the data is discarded. The data is not saved after a training cycle. As such, there is an emphasis on algorithms that support knowledge transfer, which makes use of prior knowledge of learned categories and allows for learning on minimal training examples. One way of knowledge transfer is through the reuse of model parameters, based on the similarity between previously and newly learned classes.

Referring now to FIG. 1, shown is a high-level block diagram of an adversarial semi-supervised one-shot learning system 100 for adversarial semi-supervised one-shot training using a data stream, in accordance with embodiments of the present disclosure. The adversarial semi-supervised one-shot learning system 100 includes training dataset 110, a prediction model 120, a representation model 130, and a discriminator 140. The representation model 130 includes an encoder 133, and a decoder 136.

The training dataset 110 is a component of the adversarial semi-supervised one-shot learning system 100 configured to be used to train the prediction model 120 and the representation model 130. The training dataset 110 includes unlabeled and labeled data generated from a data stream. The data stream can be information gathered from sensors located on a vehicle. For example, the sensors include, for example, 3-axis sensors, cameras, radar, and lidar sensors positioned throughout the vehicle collecting sensor data during the operation of the vehicle. The 3-axis sensors can include speed, angle, latitude, and longitude information regarding a drive recorder. The information gathered by these sensors can be considered a data stream that can be used as the training dataset 110. In some embodiments, an operator of the vehicle can label samples from the data stream. The vehicle can be connected to a cloud service, which can prompt the operator to provide information regarding a past vehicle behavior or event. For example, an operator can provide information regarding an event such as a crash, an object, a speed, and the like. The provided information can be used to label the sample and include that labeled sample in the training dataset 110. Otherwise, the samples generated from the data stream can remain unlabeled. As such, the training dataset 110 includes both a labeled dataset and an unlabeled dataset. The labeled dataset includes the labeled samples provided by an operator, and the unlabeled dataset includes samples generated from the data stream.

The prediction model 120 is a component of the adversarial semi-supervised one-shot learning system 100 configured to output a vehicle behavior based on sensor data. The prediction model 120 is a machine learning model that is trained using the labeled dataset from the training dataset 110. Vehicle behaviors include, for example, acceleration, deceleration, object avoidance, reversing, lane maintenance, and the like. The vehicle behaviors can be predicted by the prediction model 120 based on the sensor data collected by a vehicle. For example, if the sensor data detects an object in the roadway, the prediction model 120 can predict a vehicle behavior that avoids the detected object.

The prediction model 120 can employ various machine learning techniques in determining a vehicle behavior based on sensor information. Machine learning techniques can comprise algorithms or models that are generated by performing supervised training on a dataset and subsequently applying the generated algorithm or model to generate a conditional probability of a vehicle behavior. Machine learning algorithms can include but are not limited to decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), hidden Markov models, Gaussian naïve Bayes, multinomial naïve Bayes, averaged one-dependence estimators (AODE), Bayesian network (BN), classification and regression tree (CART), feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In some embodiments, the prediction model 120 is a neural network trained based Equation 1 as described below:

$$\min_{M_{Cla}} -\frac{1}{NK}\sum_{i=1}^{N}\sum_{k=1}^{K} y_i^{(k)} \ln M_{Cla}(x_i)^{(k)} + \frac{1}{N}\sum_{i=1}^{N} \ln M_{Dis}(h_{Cla}(x_i))$$

Equation 1

Where $M_{Cla}$ represents the prediction model 120. The labeled dataset is represented as a vector of inputs represented as $x \in \mathbb{R}^D (D \in \mathbb{N})$ to predict a vehicle behavior represented as a target label y. $M_{Dis}$ represents the discriminator $$140 \cdot \frac{1}{NK}\sum_{i=1}^{N}\sum_{k=1}^{K} y_i^{(k)} \ln M_{Cla}(x_i)^{(k)}$$

represents a classification loss during training and $$\frac{1}{N}\sum_{i=1}^{N} \ln M_{Dis}(h_{Cla}(x_i))$$

represents an adversarial term. N represents the number of samples. K represents the number of classes. Equation 1 can be used to optimize each labeled sample in the training dataset 110 using stochastic gradient descent. For each data observation in the stream, using stochastic gradient descent (SGD), if it is a labeled sample, we minimize Equation 1 by tuning parameters in the neural network of $M_{Cla}$, where the classification loss requires that the prediction by $M_{Cla}$ is as close to the target label y as possible and the adversarial term requires that the middle layer outputs of the prediction model $h_{Cla}(x_i)$ is as close to middle layer outputs of the representation model $h_{Enc}(x_i)$ as possible.

Once trained using labeled data, the prediction model 120 produces a prediction of a vehicle behavior and attempts to increase the error rate of the discriminator 140. The error rate is increased by producing vehicle behavior predictions the discriminator 140 believes were produced by the representation model 130.

The representation model 130 is a component of the adversarial semi-supervised one-shot learning system 100 configured to store information of past unlabeled data. In some embodiments, the representation model 130 is an autoencoder neural network that includes an encoder 133 and a decoder 136. The representation model 130 can learn a mapping from high-dimensional observations (e.g., unlabeled data) to a lower-dimensional representation space such that the original observations can be approximately reconstructed from the lower-dimensional representation. The encoder 133 of the representation model 130 can learn a representation for the unlabeled data by training the network to ignore potential noise. While the decoder 136 can generate a representation as close as possible to the original input based on the reduced encoding produced by the encoder 133. Essentially, the encoder 133 maps the unlabeled data into the code of the representation model 130, and the decoder 136 maps the code to a reconstruction of the original unlabeled data.

The representation model 130 can implement variations of an autoencoder to store information of the past unlabeled data. These variations include, for example, regularized autoencoders and variational autoencoders. The regularized autoencoders include, for example, sparse autoencoder (SAE), denoising autoencoders (DAE), and contractive autoencoders (CAE). SAEs can learn more hidden units than inputs, while only allowing a small number of hidden units to be active at once. Specifically, an SAE includes a training criterion involving a sparsity penalty within the code layer. A variation of a SAE includes a k-sparse encoder that manually zeroes all but the strongest hidden unit activations. The identification of the strongest hidden unit activations can be accomplished by sorting the activities and keeping only the first k values. A DAE can take a partially corrupted input and recover the undistorted input through denoising of the input.

Variational autoencoders are generative models, like generative adversarial networks. Variational autoencoders are directed probabilistic graphical models whose posterior is approximated by a neural network from an autoencoder-like architecture.

In some embodiments, the representation model 130 is trained as described in Equation 2 defined below:

$$\min_{M_{Dec}, M_{Enc}} \frac{1}{N} \sum_{i=1}^{N} \|x_i - M_{Dec}(M_{Enc}(x_i))\|_2^2 + \qquad \text{Equation 2}$$

$$\frac{1}{N} \sum_{i=1}^{N} \ln(1 - M_{Dis}(h_{Enc}(x_i)))$$

Where $M_{Dec}$ represents the decoder 136 and $M_{Enc}$ represents the encoder 133. The labeled dataset is represented as a vector of inputs represented as $x \in \mathbb{R}^D (D \in \mathbb{N})$ to predict a vehicle behavior represented as a target y using the unlabeled dataset as the vector of inputs X. $M_{Dis}$ represents the discriminator $$140 \cdot \frac{1}{N} \sum_{i=1}^{N} \|x_i - M_{Dec}(M_{Enc}(x_i))\|_2^2$$

represents a reconstruction loss during training and $$\frac{1}{N} \sum_{i=1}^{N} \ln(1 - M_{Dis}(h_{Enc}(x_i)))$$

represents an adversarial term. N represents the number of samples. Equation 2 can be used to optimize each labeled and unlabeled sample in the training dataset 110 using stochastic gradient descent. For each data observation in the stream, using stochastic gradient descent (SGD), we minimize Equation 2 by tuning parameters in the autoencoder consisting of the encoder $M_{Enc}$ and the decoder $M_{Dec}$, where the reconstruction loss requires that the reconstruction by $M_{Enc}$ and $M_{Dec}$, $M_{Dis}(h_{Enc}(x))$, is as close to the inputs x as possible and the adversarial term requires that the middle layer outputs of the representation model $h_{Enc}(x_i)$ is as close to the middle layer outputs of the prediction model $h_{Cla}(x_i)$ as possible.

Once trained, the representation model 130 produces a prediction of a vehicle behavior and attempts to increase the error rate of the discriminator 140. The error rate is increased by producing vehicle behavior predictions the discriminator believes were produced by the prediction model 120.

The discriminator 140 is a component of the adversarial semi-supervised one-shot learning system configured to distinguish predictions made by the prediction model 120 and the representation model 130. The discriminator 140 facilitates training of the prediction model 120, and the representation model 130 by aiming to discriminate between vehicle behavior predictions produce by either the prediction model 120 or the representation model 130. For example, the discriminator 140 predicts which of the models produced the prediction. The prediction model 120 and the representation model 130 are in competition with the discriminator 140, with the prediction model 120 and the representation model 130 adjusted or otherwise optimized to provide vehicle behavior predictions that correspond as closely as possible to each other's vehicle predictions—thereby increasing the error rate of the discriminator 140. During the training process, the discriminator 140 is trained using middle layer outputs produced by the prediction model 120 and the representation model 130. For example, the output produced by the encoder 133 can be used to train the discriminator 140 such that it increases its success rate in distinguishing vehicle behavior predictions made by the other models.

In some embodiments, the discriminator 140 is trained as described in Equation 3 defined below:

$$\min_{M_{Cla}} -\frac{1}{N} \sum_{i=1}^{N} \ln M_{Dis}(h_{Cla}(x_i)) - \ln(1 - M_{Dis}(h_{Enc}(x_i))) \qquad \text{Equation 3}$$

Where $M_{Dis}$ represents the discriminator 140 and the training dataset 110 is represented as a vector of inputs represented as $x \in \mathbb{R}^D (D \in \mathbb{N})$ to predict a discrimination represented as a target y using the training dataset as the vector of inputs $$x \cdot \frac{1}{N} \sum_{i=1}^{N} \ln M_{Dis}(h_{Cla}(x_i)) - \ln(1 - M_{Dis}(h_{Enc}(x_i)))$$

represents a discrimination loss during training. Equation 3 can be used to optimize each labeled and unlabeled sample in the training dataset 110 using stochastic gradient descent. Additionally, $h_{Cla}(x_i)$ represents a middle layer output produced by the prediction model 120 for label $x_i$, and $h_{Enc}(x_i)$ represents a middle layer output produced by the representation model 130 for label $x_i$. N represents the number of samples. For each data observation in the stream, using stochastic gradient descent (SGD), we minimize Equation 3 by tuning parameters in the discriminant $M_{Dis}$, where the discrimination loss requires that the discrimination by $M_{Dis}$ discriminate the middle layer output produced by the prediction model $h_{Cla}(x_i)$ from the middle layer output produced by the encoder $h_{Enc}(x_i)$ as correctly as possible.

It is noted that FIG. 1 is intended to depict the major representative components of an exemplary adversarial semi-supervised one-shot learning system 100. In some embodiments, however, individual components may have greater or lesser complexity than as represented in FIG. 1, components other than or in addition to those shown in FIG. 1 may be present, and the number, type, and configuration of such components may vary.

Figure 2:
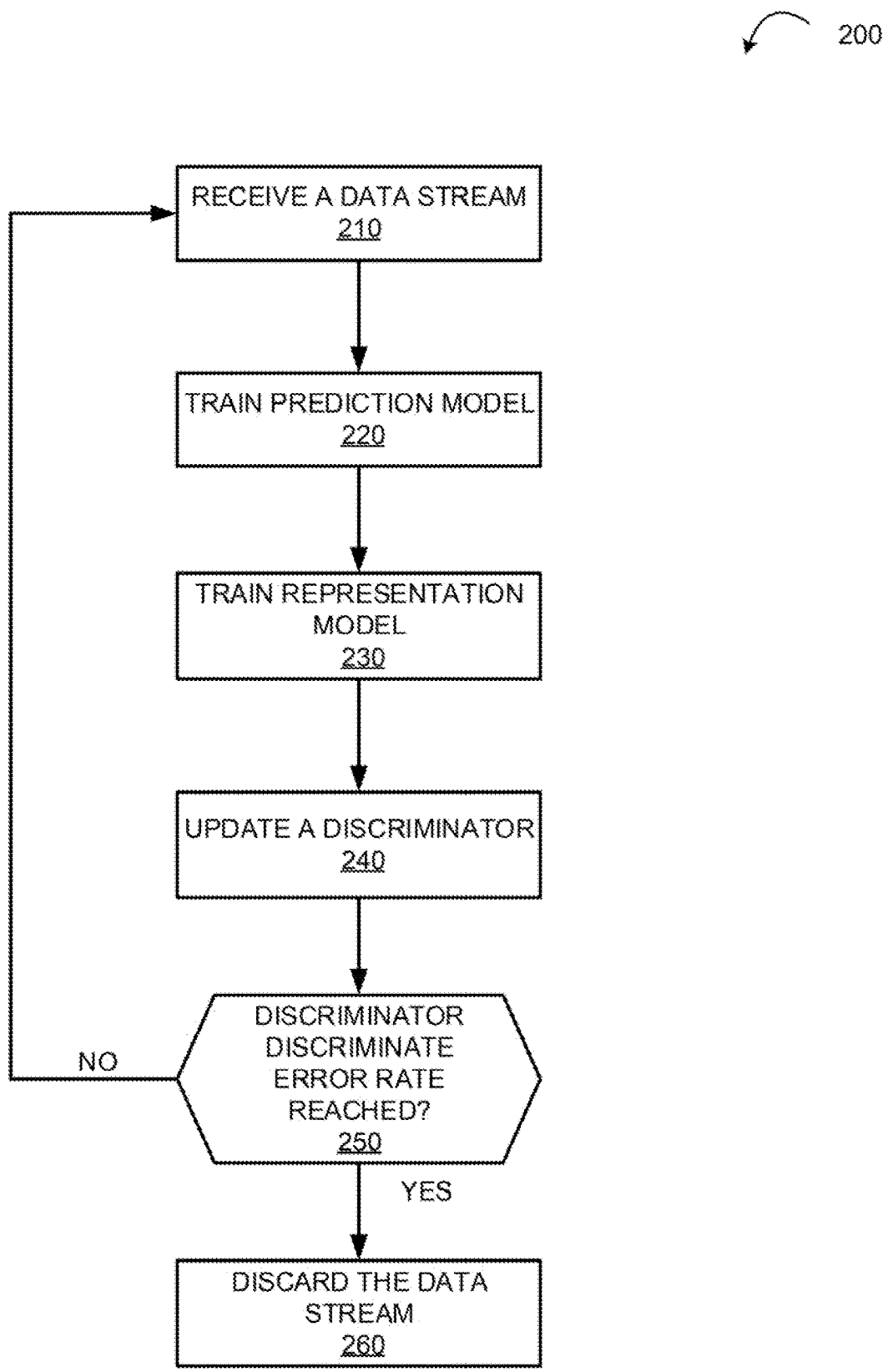
FIG. 2 is a flow diagram illustrating a process of adversarial semi-supervised one-shot learning, in accordance with embodiments of the present disclosure.

FIG. 2 is a flow diagram illustrating a process 200 of adversarial semi-supervised one-shot learning, in accordance with embodiments of the present disclosure. The process 200 may be performed by hardware, firmware, software executing on a processor, edge devices (e.g., a vehicle), cloud services, or a combination thereof. For example, any or all the steps of the process 200 may be performed by one or more processors embedded in a computing device.

The process 200 begins by receiving a data stream relating to an autonomous vehicle. The data stream includes unlabeled and labeled data generated from a data stream and used as a training dataset 110. This is illustrated at step 210. The data stream can be information gathered from sensors located on a vehicle. For example, the sensors include, for example, 3-axis sensors, cameras, radar, and lidar sensors positioned throughout the vehicle collecting sensor data during the operation of the vehicle. An operator of the vehicle can label samples from the data stream. The vehicle can be connected to a cloud service, which can prompt the operator to provide information regarding a past vehicle behavior or event. For example, an operator can provide information regarding an event such as a crash, an object, a speed, and the like. The provided information can be used to label the sample and include that labeled sample in the training dataset 110.

The prediction model 120 is trained using the labeled dataset from the training dataset 110 produced by the data stream. This is illustrated at step 220. The prediction model 120 can be trained using stochastic gradient descent of the labeled data. Additionally, the training can be based on a classification loss and an adversarial term. In some embodiments, the classification loss and the adversarial term are based on Equation 1 defined above. The classification loss can be a cross-entropy between the labeled dataset and the predictions produced by the prediction model 120. The adversarial term can also be a cross-entropy between a middle layer output of the representation model 130 and predictions produced by the prediction model 120. During the training of the prediction model 120, the classification loss is minimized, and the adversarial term is maximized during each training cycle in order to improve the performance of the prediction model 120.

The representation model 130 is trained using the training dataset 110 produced by the data stream. This is illustrated at step 230. In some embodiments, the training dataset 110 only has an unlabeled dataset. The representation model 130 can still be trained using only the unlabeled dataset. However, if a labeled dataset is available, then the representation model 130 can be trained with both the unlabeled dataset and the labeled dataset from the training dataset 110. The representation model 130 is trained with the training dataset 110 using stochastic gradient descent on the training dataset 110. Additionally, the training can be based on a reconstruction loss and an adversarial term. In some embodiments, the reconstruction loss and the adversarial term are based on Equation 2 defined above. The reconstruction loss can be a squared loss between the training dataset 110 and predictions produced by the representation model 130. The adversarial term can be a cross-entropy between middle layer outputs of the prediction model 120 and predictions made by the representation model 130. During the training of the representation model 130, the reconstruction loss is minimized, and the adversarial term is maximized during each training cycle in order to improve the performance of the representation model 130.

The discriminator 140 is updated using middle layer outputs produced by the prediction model 120 and the representation model 130. This is illustrated at step 240. Similar to the representation model 130, the discriminator 140 can still be trained when only unlabeled datasets are available. However, if a labeled dataset is available, then the discriminator 140 can still be updated. The discriminator 140 is updated by applying stochastic gradient descent on the middle layer outputs produced by the prediction model 120 and the representation model 130. Additionally, the training can be based on a discrimination loss. In some embodiments, the discrimination loss is based on Equation 3 defined above. The discrimination loss can be a cross-entropy between the middle layer outputs of the prediction model 120 and the middle layer outputs of the representation model 130. While updating the discriminator 140, the discrimination loss is minimized during each training cycle in order to improve the performance of the discriminator 140.

The prediction model 120 and the representation model 130 predictions are analyzed to determine whether their vehicle behavior predictions result in a discrimination error rate threshold by the discriminator 140. This is illustrated at step 250. The error rate threshold can be a predetermined threshold set such that the models are satisfactorily trained. For example, the error rate threshold can be set at 75% error rate for the discriminator 140 predictions. If the discriminator 140 is unable to discriminate which predictions were produced by either model at a 75% rate, then the models can be viewed as sufficiently trained. If the models exceed the threshold, then the data stream is discarded, and the training is completed. This is illustrated at step 260. However, if the threshold has not been reached, the training cycle returns to step 210 and repeats itself until the training results in the models reaching the threshold. The training can also occur when an observation occurs on the data stream in order to achieve improved performance of the prediction model 120 and the representation model 130.

Figure 3:
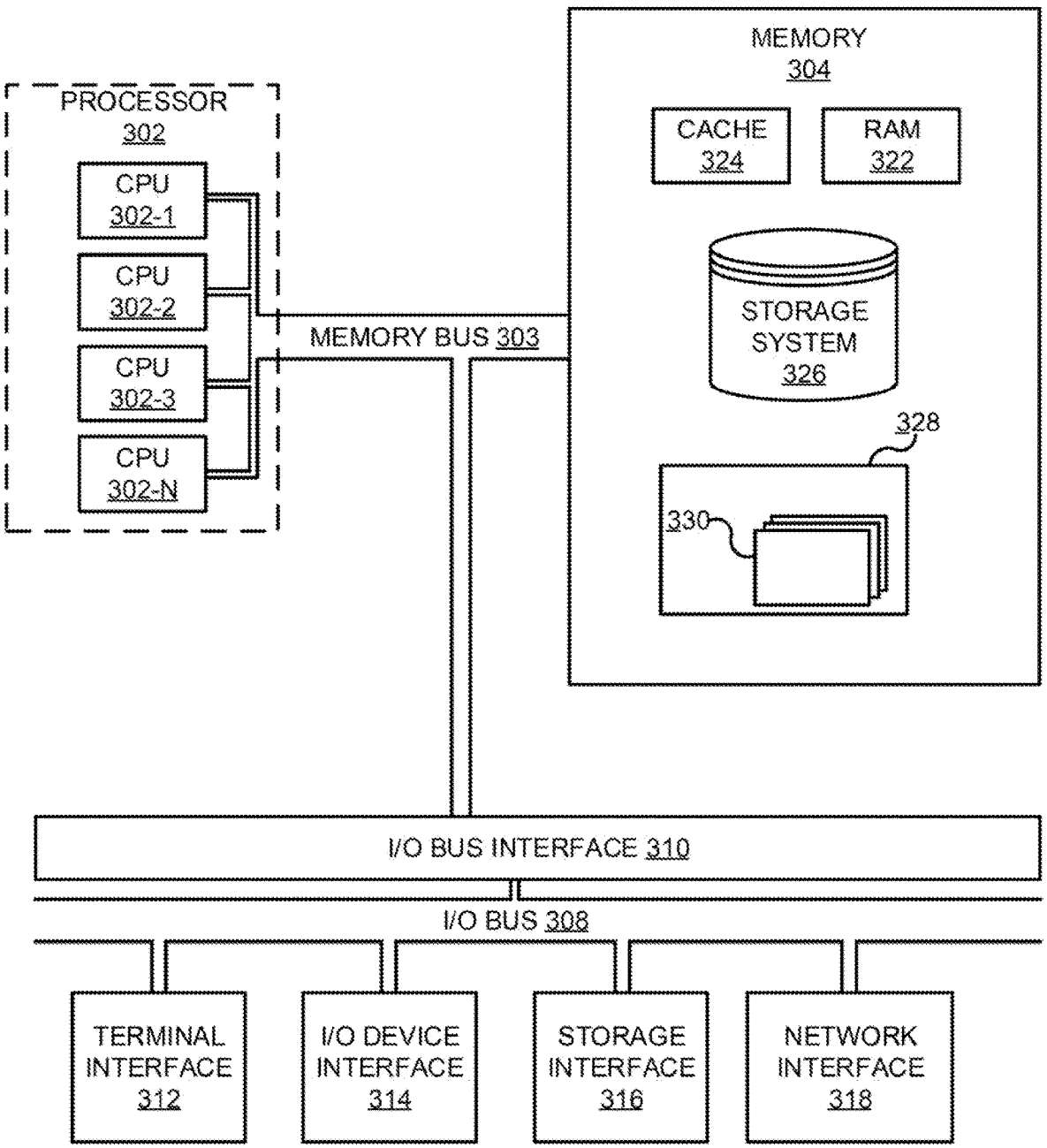
FIG. 3 is a high-level block diagram illustrating an example computer system that may be used in implementing one or more of the methods, tools, and modules, and any related functions, described herein, in accordance with embodiments of the present disclosure.

Referring now to FIG. 3, shown is a high-level block diagram of an example computer system 300 (e.g., the adversarial semi-supervised one-shot learning system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 300 may comprise one or more processors 302, a memory 304, a terminal interface 312, an I/O (Input/Output) device interface 314, a storage interface 316, and a network interface 318, all of which may be communicatively coupled, directly or indirectly, for inter-component communication via a memory bus 303, an I/O bus 308, and an I/O bus interface 310.

The computer system 300 may contain one or more general-purpose programmable central processing units (CPUs) 302-1, 302-2, 302-3, and 302-N, herein generically referred to as the processor 302. In some embodiments, the computer system 300 may contain multiple processors typical of a relatively large system; however, in other embodiments, the computer system 300 may alternatively be a single CPU system. Each processor 301 may execute instructions stored in the memory 304 and may include one or more levels of onboard cache.

The memory 304 may include computer system readable media in the form of volatile memory, such as random-access memory (RAM) 322 or cache memory 324. Computer system 300 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the processors 302, the memory 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 300 may, in some embodiments, contain multiple I/O bus interface units, multiple I/O buses, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 300 may be a multi-user mainframe computer system, a single-user system, or a server computer or similar device that has little or no direct user interface but receives requests from other computer systems (clients). Further, in some embodiments, the computer system 300 may be implemented as a desktop computer, portable computer, laptop or notebook computer, tablet computer, pocket computer, telephone, smartphone, network switches or routers, or any other appropriate type of electronic device.

It is noted that FIG. 3 is intended to depict the major representative components of an exemplary computer system 300. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 (e.g., the adversarial semi-supervised one-shot learning system 100), may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and P.D.A.s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 4:
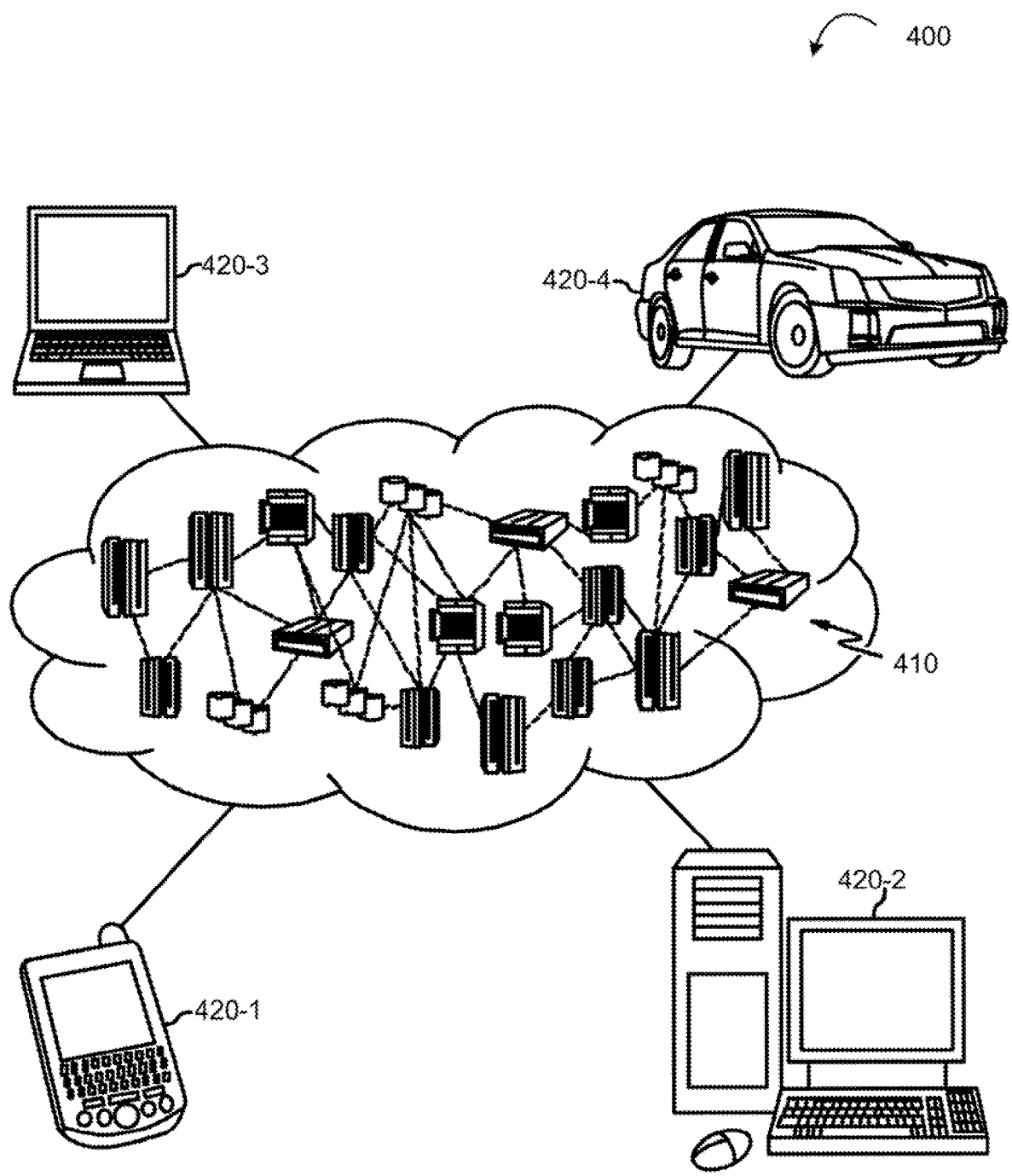
FIG. 4 depicts a cloud computing environment, in accordance with embodiments of the present disclosure.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (P.D.A.) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1 to 420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
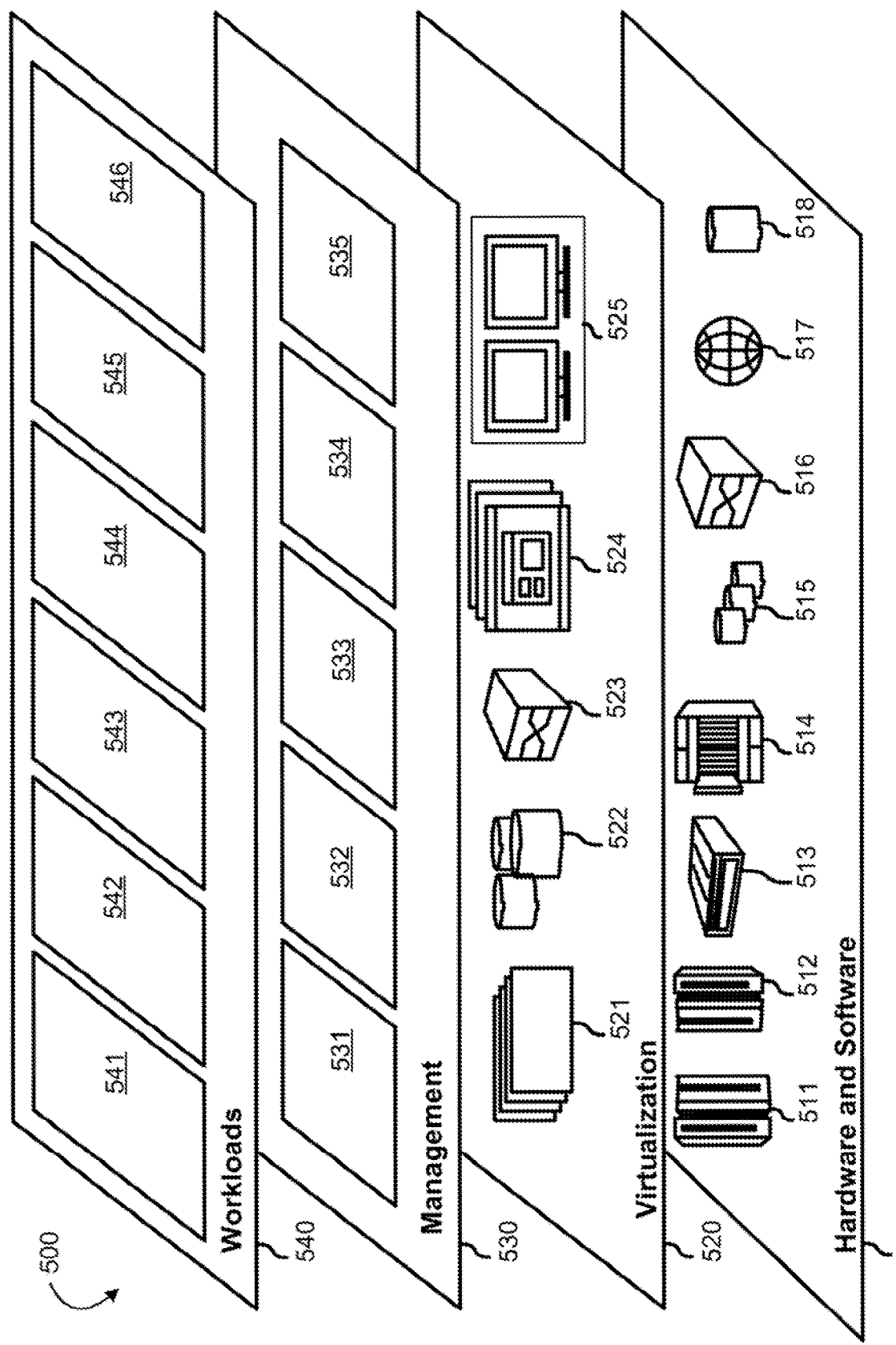
FIG. 5 depicts abstraction model layers, in accordance with embodiments of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 may provide the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (S.L.A.) planning and fulfillment 535 provide pre-arrangement for, and procurement of, cloud computing resources for which a future requirement is anticipated in accordance with an S.L.A.

Workloads layer 540 provides examples of functionality for which the cloud computing environment may be utilized. Examples of workloads and functions which may be provided from this layer include mapping and navigation 541; software development and lifecycle management 542 (e.g., the adversarial semi-supervised one-shot learning system 100); virtual classroom education delivery 543; data analytics processing 544; transaction processing 545; and precision cohort analytics 546.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method of adversarial semi-supervised one-shot training using a data stream, the computer-implemented method comprising:
    receiving a data stream based on an observation, wherein the data stream includes unlabeled data and labeled data;
    training a prediction model with the labeled data using stochastic gradient descent based on a classification loss and an adversarial term;
    training a representation model with the labeled data and the unlabeled data based on a reconstruction loss and the adversarial term;
    updating a discriminator with middle layer output data from the prediction model and the representation model and based on a discrimination loss; and
    discarding the data stream.

2. The computer-implemented method of claim 1, wherein the classification loss is a cross-entropy between the labeled data and a prediction output from the prediction model.

3. The computer-implemented method of claim 1, wherein the adversarial term is a cross-entropy between the middle layer output data from the prediction model and the representation model.

4. The computer-implemented method of claim 1, wherein the reconstruction loss is a squared loss between the data stream and a reconstruction output by the representation model.

5. The computer-implemented method of claim 1, wherein the discrimination loss is a cross-entropy between the middle layer output data of the prediction model and the representation model.

6. The computer-implemented method of claim 1, wherein the representation model is an autoencoder based on a neural network.

7. The computer-implemented method of claim 1, wherein the prediction model is a neural network with a bottom layer as an encoder.

8. The computer-implemented method of claim 1, wherein the discriminator is a neural network configured to discriminate between middle layer outputs of the prediction model and middle layer outputs of the representation model.

9. A system of adversarial semi-supervised one-shot training using a data stream, the system comprising:
    a memory;
    a processor;
    local data storage having stored thereon computer executable code;
    a prediction model configured to predict a vehicle behavior, wherein the prediction model is trained with labeled data from a data stream using stochastic gradient descent based on a classification loss and an adversarial term;
    a representation model configured to predict the vehicle behavior, wherein the representation model is trained with unlabeled data and the labeled data from the data stream based on a reconstruction loss and the adversarial term; and
    a discriminator configured to predict predictions made by the prediction model and the representation model, wherein the discriminator is trained with middle layer output data from the prediction model and the representation model and based on a discrimination loss.

10. The system of claim 9, wherein the classification loss is a cross-entropy between the labeled data and a prediction output from the prediction model.

11. The system of claim 9, wherein the adversarial term is a cross-entropy between the middle layer output data from the prediction model and the representation model.

12. The system of claim 9, wherein the reconstruction loss is a squared loss between the data stream and a reconstruction output by the representation model.

13. The system of claim 9, wherein the discrimination loss is a cross-entropy between the middle layer output data of the prediction model and the representation model.

14. The system of claim 9, wherein the representation model is an autoencoder based on a neural network.

15. The system of claim 9, wherein the prediction model is a neural network with a bottom layer as an encoder.

16. The system of claim 9, wherein the discriminator is a neural network configured to discriminate between outputs of middle layers of the prediction model and middle layers of the representation model.

17. A computer program product for adversarial semi-supervised one-shot training using a data stream, the computer program product comprising:
    one or more computer readable storage medium, and program instructions stored on the one or more computer readable storage media, the program instructions comprising:
    program instructions to receive a data stream based on an observation, wherein the data stream includes unlabeled data and labeled data;
    program instructions to train a prediction model with the labeled data using stochastic gradient descent based on a classification loss and an adversarial term;
    program instructions to train a representation model with the labeled data and the unlabeled data based on a reconstruction loss and the adversarial term;

program instructions to update a discriminator with middle layer output data from the prediction model and the representation model and based on a discrimination loss; and program instructions to discard the data stream.

18. The computer program product of claim 17, wherein the classification loss is a cross-entropy between the labeled data and a prediction output from the prediction model.

19. The computer program product of claim 17, wherein the adversarial term is a cross-entropy between the middle layer output data from the prediction model and the representation model.

20. The computer program product of claim 17, wherein the reconstruction loss is a squared loss between the data stream and a reconstruction output by the representation model.

\* \* \* \* \*